United States Patent
Barbir et al.

(10) Patent No.: US 9,531,542 B2
(45) Date of Patent: Dec. 27, 2016

(54) SECURE REMOTE PASSWORD

(71) Applicant: Bank of America Corporation, Charlotte, NC (US)

(72) Inventors: Abdulkader Barbir, Ontario (CA); Eileen D. Bridges, Fort Mill, SC (US); Davindar Gill, Palatine, IL (US); Lawrence R. LaBella, Bellmore, NY (US); Craig Worstell, Gig Harbor, WA (US)

(73) Assignee: Bank of America Corporation, Charlotte, NC (US)

( * ) Notice: Subject to any disclaimer, the term of this patent is extended or adjusted under 35 U.S.C. 154(b) by 97 days.

(21) Appl. No.: 14/491,541

(22) Filed: Sep. 19, 2014

(65) Prior Publication Data

US 2016/0087797 A1    Mar. 24, 2016

(51) Int. Cl.
    *G06F 21/31*     (2013.01)
    *H04L 9/32*     (2006.01)
    *H04L 29/06*     (2006.01)

(52) U.S. Cl.
    CPC ........... *H04L 9/3236* (2013.01); *H04L 9/3226* (2013.01); *H04L 9/3273* (2013.01); *H04L 63/062* (2013.01); *H04L 63/126* (2013.01)

(58) Field of Classification Search
    USPC .... 713/171, 2, 168, 180, 183, 186; 726/1, 6, 726/7; 380/277
    See application file for complete search history.

(56) References Cited

U.S. PATENT DOCUMENTS

| | | | | |
|---|---|---|---|---|
| 8,667,267 | B1* | 3/2014 | Garcia | H04L 63/0869 380/202 |
| 2003/0026273 | A1* | 2/2003 | Davison | H04L 12/2856 370/409 |
| 2004/0003241 | A1* | 1/2004 | Sengodan | H04L 9/3236 713/168 |
| 2007/0005973 | A1* | 1/2007 | Mynam | H04L 63/123 713/171 |
| 2007/0050212 | A1* | 3/2007 | Kearby | G06F 19/3418 705/3 |
| 2007/0055731 | A1* | 3/2007 | Thibeault | H04L 12/581 709/204 |
| 2010/0111307 | A1* | 5/2010 | Hu | H04L 9/0841 380/277 |
| 2011/0055585 | A1* | 3/2011 | Lee | H04L 9/0844 713/183 |

(Continued)

*Primary Examiner* — Sayed Beheshti Shirazi
(74) *Attorney, Agent, or Firm* — Banner & Witcoff, Ltd.; Michael A. Springs (57) ABSTRACT

Aspects of the present disclosure pertain to system and method of securing mobile devices using virtual certificates at a computer processor. A method may include receiving a request for access to a computer network associated with a computing device to an application associated with a network connected server processor; electronically receiving, at the server processor, a first security key fragment from the computing device; the first security key fragment being paired with a verifier key fragment unknown to the computing device; generating a conditional seed key fragment at the server processor associated with the verifier key fragment; comparing a first hash parameter to a second hash parameter at the server processor; transmitting, at the server processor, a session security key for enabling network access to the application associated with the server processor.

20 Claims, 5 Drawing Sheets

(56) References Cited

U.S. PATENT DOCUMENTS

| | | | |
|---|---|---|---|
| 2011/0302398 A1* | 12/2011 | Ureche | H04L 9/0822 713/2 |
| 2012/0096101 A1 | 4/2012 | Murphy | |
| 2012/0106401 A1 | 5/2012 | Rosenberg et al. | |
| 2012/0134495 A1* | 5/2012 | Liu | H04L 9/0894 380/46 |
| 2012/0143772 A1* | 6/2012 | Abadir | G06Q 20/085 705/75 |
| 2012/0163581 A1* | 6/2012 | Lieber | H04L 9/0894 380/28 |
| 2012/0166791 A1 | 6/2012 | Barton et al. | |
| 2012/0166809 A1 | 6/2012 | Barton et al. | |
| 2012/0239577 A1* | 9/2012 | Wolfs | G06Q 20/32 705/64 |
| 2012/0243687 A1* | 9/2012 | Li | H04L 9/085 380/277 |
| 2013/0046985 A1* | 2/2013 | Allen | H04L 9/0825 713/171 |
| 2013/0054966 A1 | 2/2013 | Clay | |
| 2013/0055363 A1 | 2/2013 | Dattagupta et al. | |
| 2013/0067552 A1 | 3/2013 | Hawkes et al. | |
| 2013/0091200 A1 | 4/2013 | Murphy | |
| 2013/0097281 A1 | 4/2013 | Boudreau et al. | |
| 2013/0103808 A1 | 4/2013 | Srinivasa et al. | |
| 2013/0124285 A1 | 5/2013 | Pravetz et al. | |
| 2013/0124292 A1* | 5/2013 | Juthani | G06F 21/41 705/14.26 |
| 2013/0125197 A1 | 5/2013 | Pravetz et al. | |
| 2013/0125220 A1 | 5/2013 | Heffez | |
| 2013/0125221 A1* | 5/2013 | Agrawal | H04L 9/3226 726/6 |
| 2013/0125222 A1 | 5/2013 | Pravetz et al. | |
| 2013/0145482 A1 | 6/2013 | Ricci et al. | |
| 2013/0198737 A1 | 8/2013 | Ricci | |
| 2013/0198802 A1 | 8/2013 | Ricci | |
| 2013/0200991 A1 | 8/2013 | Ricci et al. | |
| 2013/0203400 A1 | 8/2013 | Ricci | |
| 2013/0204466 A1 | 8/2013 | Ricci | |
| 2013/0204484 A1 | 8/2013 | Ricci | |
| 2013/0204493 A1 | 8/2013 | Ricci et al. | |
| 2013/0204943 A1 | 8/2013 | Ricci | |
| 2013/0205026 A1 | 8/2013 | Ricci | |
| 2013/0205412 A1 | 8/2013 | Ricci | |
| 2013/0208893 A1 | 8/2013 | Shablygin et al. | |
| 2013/0212385 A1* | 8/2013 | Schechter | G06F 21/31 713/168 |
| 2013/0212704 A1 | 8/2013 | Shablygin et al. | |
| 2013/0218412 A1 | 8/2013 | Ricci | |
| 2013/0219039 A1 | 8/2013 | Ricci | |
| 2013/0226812 A1 | 8/2013 | Landrok et al. | |
| 2013/0227648 A1 | 8/2013 | Ricci | |
| 2013/0232248 A1 | 9/2013 | Kraus et al. | |
| 2013/0232554 A1 | 9/2013 | Campagna et al. | |
| 2013/0246637 A1 | 9/2013 | Garcia Jurado Suarez et al. | |
| 2013/0276060 A1 | 10/2013 | Wiedmann et al. | |
| 2013/0279698 A1 | 10/2013 | Bradley | |
| 2013/0282238 A1 | 10/2013 | Ricci et al. | |
| 2013/0290416 A1 | 10/2013 | Nelson et al. | |
| 2014/0029607 A1 | 1/2014 | Vasquez et al. | |
| 2014/0032935 A1* | 1/2014 | Kim | G06F 21/6218 713/193 |
| 2014/0033286 A1* | 1/2014 | Zhang | H04L 63/083 726/7 |
| 2014/0047518 A1 | 2/2014 | Pravetz et al. | |
| 2014/0093081 A1 | 4/2014 | Hawkes et al. | |
| 2014/0094147 A1 | 4/2014 | Hawkes et al. | |
| 2014/0139318 A1* | 5/2014 | Malpani | G06F 21/32 340/5.82 |
| 2014/0143839 A1 | 5/2014 | Ricci | |
| 2014/0164488 A1 | 6/2014 | Boudreau | |
| 2014/0196140 A1 | 7/2014 | Gong | |
| 2014/0229558 A1 | 8/2014 | Ricci | |
| 2014/0230007 A1* | 8/2014 | Roth | G06F 21/6209 726/1 |
| 2014/0245390 A1 | 8/2014 | Clay | |
| 2014/0278475 A1 | 9/2014 | Tran | |
| 2015/0195278 A1* | 7/2015 | Plotkin | H04L 63/0861 713/186 |
| 2015/0379286 A1* | 12/2015 | Nordback | G06F 21/6209 713/165 |
| 2016/0034708 A1* | 2/2016 | Shim | G06F 21/6245 713/186 |

* cited by examiner

SECURE REMOTE PASSWORD

BACKGROUND

Mobile device computing can be used with cloud computing technology. Electronic Data residing on the mobile device may be vulnerable to unauthorized individuals or software seeking to obtain the data. Data on the mobile device should be secure from unauthorized distribution. Mobile devices use e-commerce and Internet applications to operate and transmit data over a world-wide interconnected communications network. Cloud computing is becoming increasingly popular. In cloud computing, a cloud may be an aggregation of resources provisioned on demand. Cloud computing may involve cloud resources performing computations instead of, or in addition to, a user's computer. Cloud computing has been compared to a utility, where computing is the service being provided. Numerous consumers use the Internet, among things to purchase products on-line, locate special events, read news stories, pay bills or perform on-line banking Numerous business establishments are connected to the Internet to provide products and services to the consumer or perform business-to-business electronic commerce.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure pertain to system and method of securing mobile devices using virtual certificates at a computer processor. A computer implemented method and computer readable media may include electronically receiving a request for access to a computer network associated with a computing device to an application associated with a network connected server processor; electronically receiving, at the server processor, a first security key fragment from the computing device; the first security key fragment being paired with a predetermined verifier key fragment unknown to the computing device; generating a conditional seed key fragment at the server processor associated with the verifier key fragment; electronically comparing a first hash parameter to a second hash parameter at the server processor; the second hash parameter being generated based on the verifier key fragment and the seed key fragment; the first hash parameter being received by the server processor; and determining whether the first hash parameter and the second hash parameter match; if values of the first hash parameter and the second hash parameter match, electronically transmitting, at the server processor, a session security key for enabling network access to the application associated with the server processor.

In another aspect, the present disclosure includes at method of electronically transmitting, at the server processor, the seed key fragment to the computing device while maintaining a verifier key fragment at the server processor; and electronically receiving, at the server processor, the first hash parameter generated from a hash function based on the seed key fragment and the first security key fragment.

In another aspect of the present disclosure, the first key fragment is associated with a username, and the seed key fragment is associated with the computing device, and the verifier key fragment being associated with the application.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
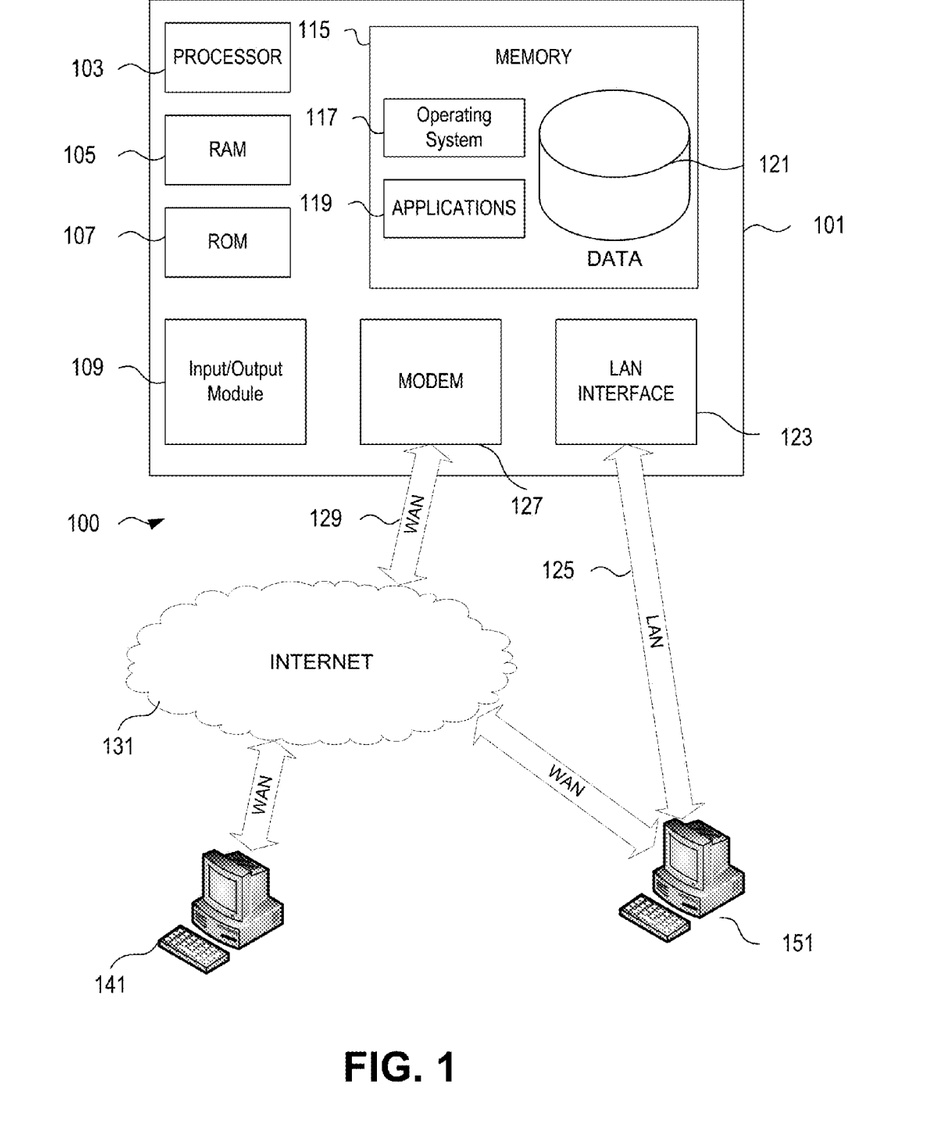
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
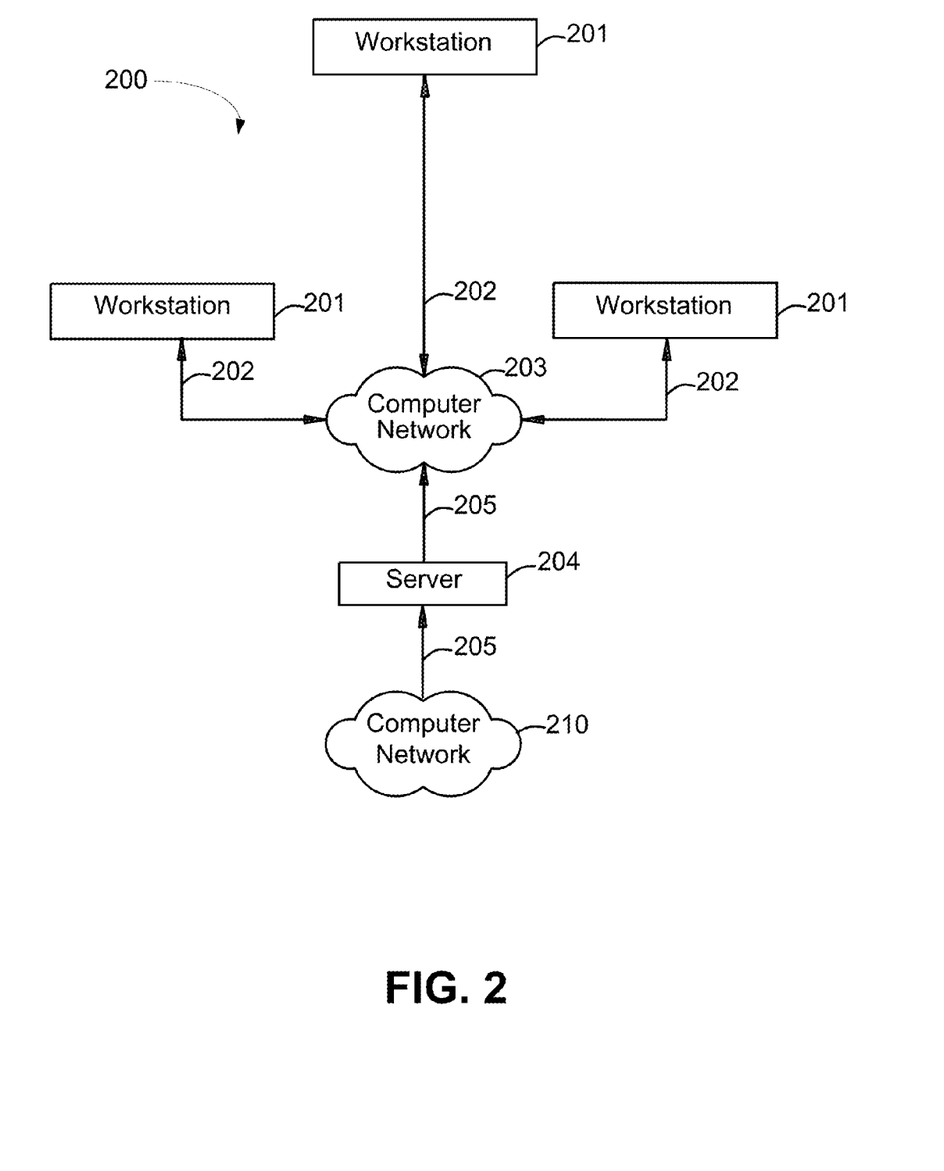
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203, 210 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204 (e.g. network control center), such as network links, dial-up links, wireless links, hard-wired links, as well as network types developed in the future, and the like. A virtual machine may be a software implementation of a computer that executes computer programs as if it were a standalone physical machine. The steps that follow in the Figures may be implemented by one or more of the components in FIGS. 1 and 2 and/or other components, including other computing devices.

Figure 3:
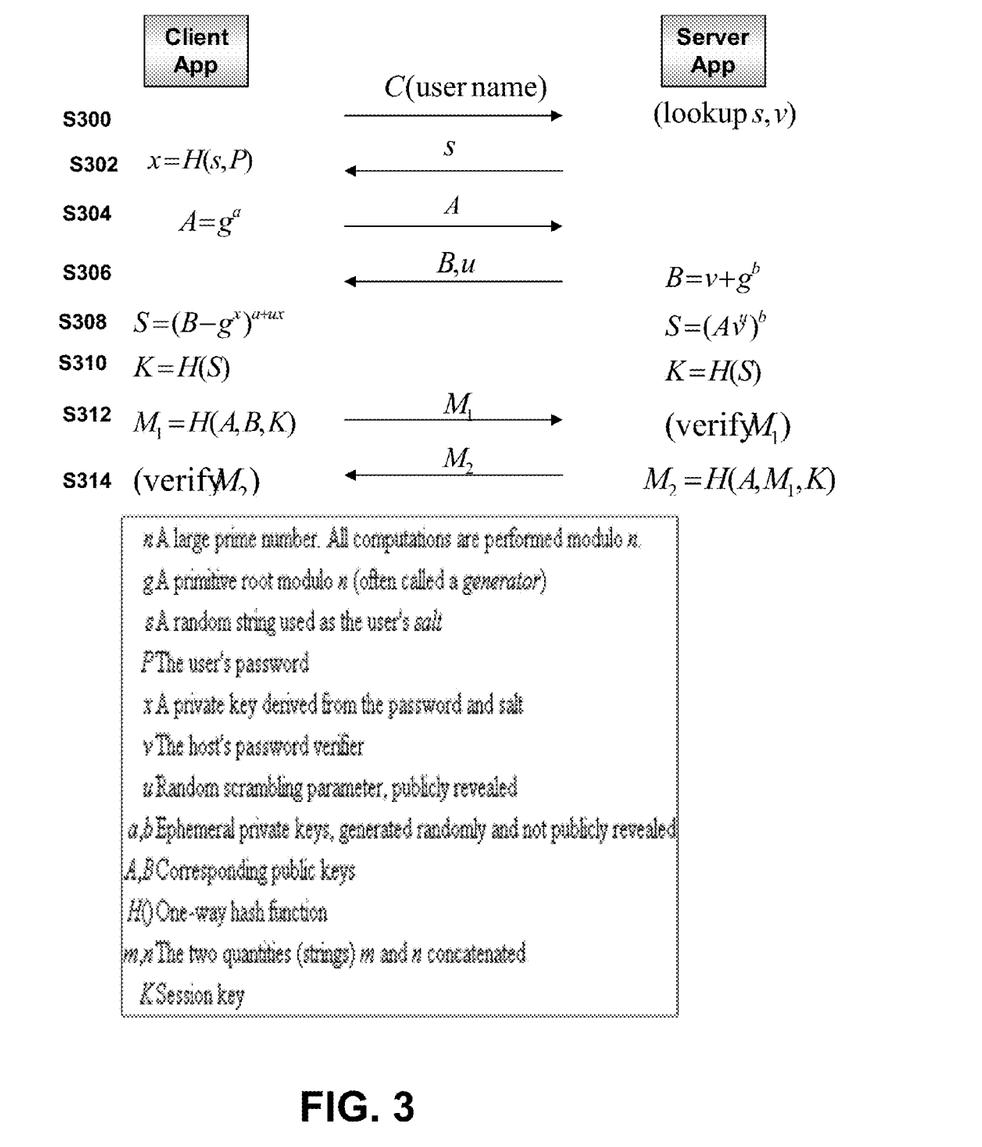
FIG. 3 depicts an illustrative process in which various aspects of the present disclosure may be implemented in accordance with one or more example embodiments.

Aspects of the present disclosure may employ, for example, Secure Remote Password (SRP) protocol which is an implementation of a public key exchange handshake described in the IETF RFC 2945. Nevertheless, other protocols could be used. A schematic illustration of the SRP protocol process is shown in FIG. 3. The SRP protocol provides cryptographically strong network authentication mechanism suitable for negotiating secure connections using a user-supplied password. In the enrollment phase, to establish a password P with Sever application, Client application picks a random salt s, and computes:

$$x=H(s,P), v=g^x$$

In Step S300, client application sends Server application a username, (e.g. username). Server application looks up Client application's username entry and fetches the password verifier v and client application's salt s. The n and g variables are well-known values, agreed to beforehand in the protocol. In Step 302, Server application sends s to Client application. Client application computes its long-term private key x using s and the user's real password P. In Step S304, Client application generates a random number a, $1<a<n$, computes its ephemeral public key $A=g\hat{\ }a$, and sends it to Server application. In Step S306, Server application generates its own random number b, $1<b<n$, computes its ephemeral public key $B=v+g\hat{\ }b$, and sends it back to Client application, along with the randomly generated parameter u.

In Step S308, Client application and Server application compute the common exponential value $S=g\hat{\ }(ab+bux)$ using the values available to each of them. If Client application's password P entered in Step matches the one it originally used to generate v, then both values of S will match. In Step S310, both sides hash the exponential S into a cryptographically strong session key. In Step S312, Client application sends Server application M1 as evidence that the client has the correct session key. Server application computes M1 itself and verifies that it matches what Client application sent to it. In Step S314, Server application sends Client application M2 as evidence that it also has the correct session key (K). Client application may optionally verify M2 itself, accepting only if it matches Server application's value.

Figure 4:
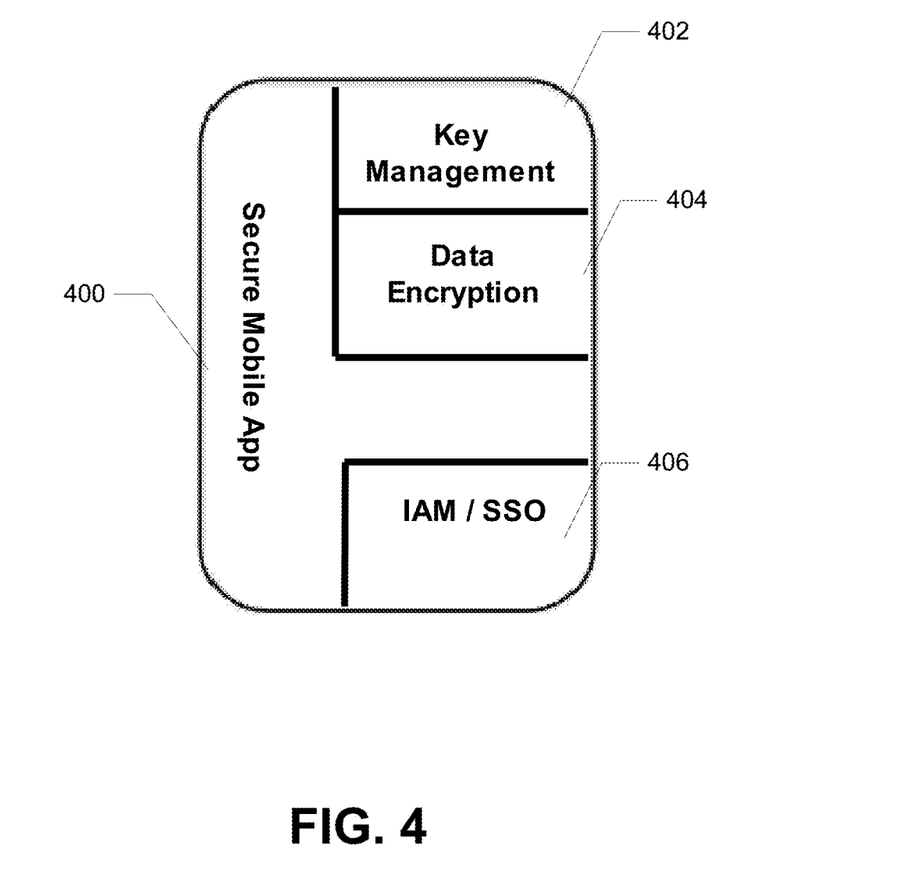
FIG. 4 depicts an illustrative operating environment in which various aspects of the present disclosure may be implemented in accordance with one or more example embodiments.

FIG. 4 depicts an illustrative mobile computing device operating environment in which various aspects of the present disclosure may be implemented. A secure mobile application 400 resides in a computer readable memory. In one implementation, a keychain API 402 may be used to store security keys. An API 406 can assist in single sign-on (SSO) and an Identity and Access Management Services (IAM) provided with an operating system. A data encryption/decryption component 404 is provided for various functions as described herein. The data encryption/decryption component 404 can be implemented with any available computer implemented method, such as Advanced Encryption Standard (AES) 256 or other known available data encryption methods.

Aspects of the present disclosure pertains to a computer implemented process of using a mobile computing device 201 (e.g., mobile smartphone, tablet, slate, and/or laptop; See FIG. 2) or any computing device on an un-trusted network or a trusted network 203 to server 204. In the process, the system may create a security protocol with the following characteristics; the protocol can connect to the server side, the protocol provides control that enables a seed/salt to be exchanged in a way where a verifier is derived; the verifier is not exchanged after the initial enrollment step between client mobile device and server in which it can be tied to one part of that identifier at a time or tied to a collection of identifiers at a time. In this implementation, the verifier is maintained confidentially on the server 204. In the enrollment process, the security protocol may be employed using Security Sockets Layer (SSL) protocol to the user's device. The processes described herein can be performed by mutual authentication by the client application.

In the implementation, the client application may be assigned or create a unique username. The client application has a password randomly assigned by the server application or created by the user. The server application generates a seed/salt, a verifier pair associated with the password. The server application sends the seed/salt to the client application and maintains the value of the verifier confidentially. The client application generates a session key with the seed/salt and password using a hash function. The server application independently generates session key using a hash function associated with the verifier and seed/salt. The session key hash values on the client application and server application are compared. If the values match, the session key can be used for secure data communications between the client application and server to encrypt data traffic. The process can be operated as a software application running on top of an operating system (OS) or as a component part of the operating system of a server or mobile device.

Figure 5:
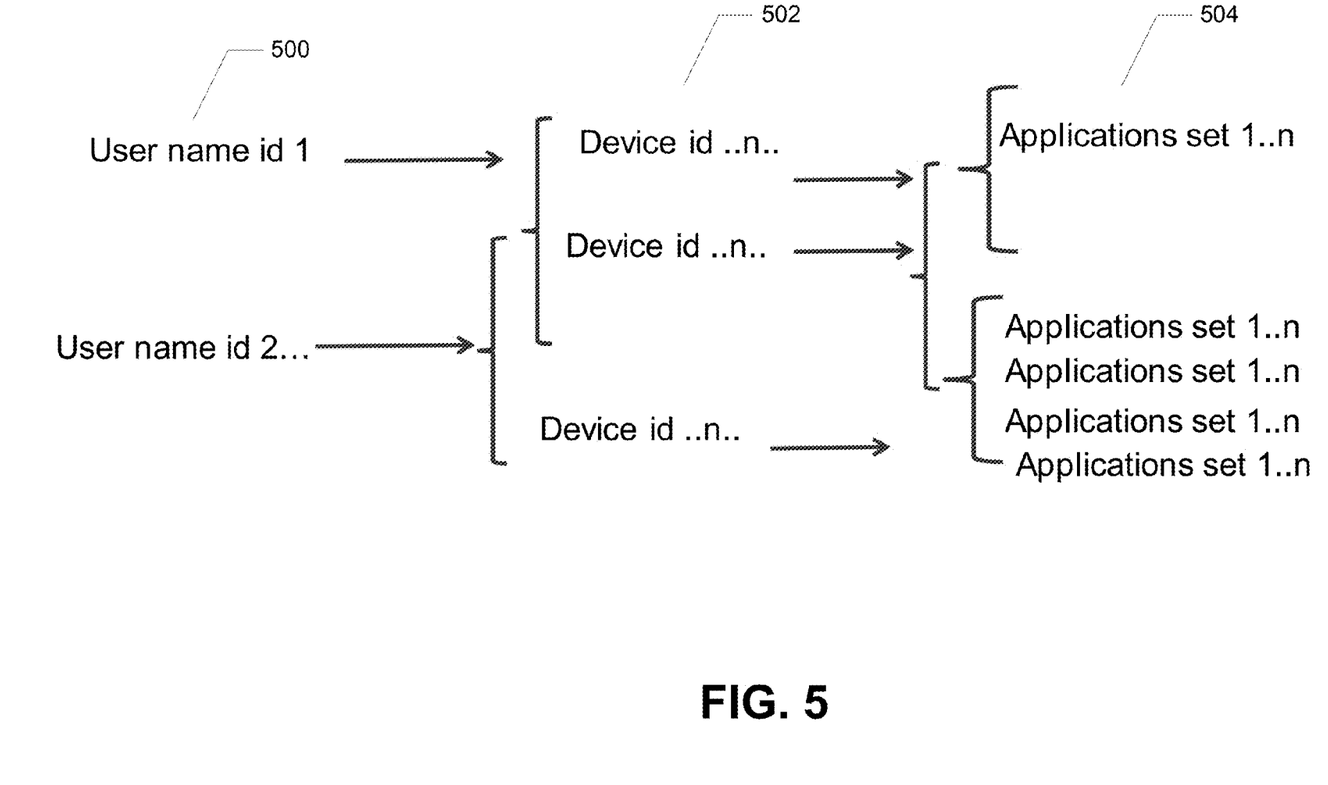
FIG. 5 depicts an illustrative functional process in which various aspects of the present disclosure may be implemented in accordance with one or more example embodiments.

Referring to FIG. 5, a Username-Id1 500 becomes an identifier to logon to the server 204. As such, the Username-Id1 500 is a component provided by the user. For example, Username-Id1 could be stored in the connected device or it could be manual user input, such as a text username. In another implementation, the Username-Id1 500 could be an electronic mail address such as User1@domainname address. In another implementation, the Username-Id1 500 could be a combination of the computer readable storage on the connected device (for example, unique identification with media access code or RFID of the mobile device). In yet another implementation, the Username-Id1 500 could be a computer data representative of a human biometric scanned for authentication (e.g., iris, retina, fingerprint, facial recognition, voice imprint and/or DNA). In another implementation, the Username-Id1 500 can be a Quick Response (QR) code coming from the user's mobile device after it is presented on a screen display of the device and is scanned with a compatible QR code reader application.

With continued reference to FIG. 5, at the enrollment stage of the process, the Username-Id1 500 is presented as an identifier to network 205 and may include multiple cascaded components for authorizations to the network per device of the user and per application for access by the associated mobile device. In one implementation, each subcomponent (e.g., device-application pair) can run in an SRP cycle, for example. The Username-Id1 500 with device identifier 502 and Application-Id 504 can be concatenated so that a complex identifier is created to have separate authorization sessions per device and application. For example, the server 204 security control software can identify the user but with a device 1 which is the user's smartphone or device 2 which is the user's tablet or device 3 which could be the user's second tablet/PC. Then a third subpart identifier points to, within device 1, a set of applications authorized for only that particular device or an application authorized for that device. Generally, the server 204 can group the sub-identifiers from the username to the device and within that device to an application or set of applications. In this way, identifier registration steps become a complex set of sequence steps that is difficult to be comprised to unauthorized third parties.

In this implementation, the Username-Id1 500 is tied to a specific Device-Id 502. Then an Application-Id1 504 is tied to the Device-Id 502. Multiple applications 1 through N can be securely and logically linked to the Device-Id 502. In the enrollment process, the Device-Id 502 and Application-Id 504 pair can be concatenated to form a random seed (e.g., the "salt" in the SRP protocol, but provided by server) at the server application side. The concatenation process can take the form of appending characters of the Device-Id with the Application-Id. The seed stems from the server 204 and the verifier (e.g., v parameter as the SPR protocol) from the server side. There is a server seed/salt (e.g., Device-Id and Application-Id) that can be verified at the client side triggered by an event and that seed is used to become like a fragment of seeds. Each one of those fragments (e.g., Application-Id) can be logically mapped to an application or derive the seed from the uniqueness of the server verifier parameter to an application only authorized to the Username Id-Device Id pair.

The Username-Id 500 may logically point to unlimited number of devices and applications within to the network server 204. Of course, the number of authorized devices per user and/or number of authorized applications per device or user can be adjusted to an upper threshold limit. A virtual certificate controlled by the server may include Username-Id/Device-Id/Application-Id each one of the components can be used in the SRP protocol. In one example of the process protocol, an SRP session can be implemented for each Device Id and Application Id pair to create unique device-application session keys to enhance the security. The server 204 controls the security and the server 204 includes an identifier for the user. To the computer system server 204 that user is not one user, but the user identification points to a collection of user devices and applications. In one example implementation of an enrollment process, a user may want to use to a device to connect to the network 204 but under different roles. In one case, it may be user's smartphone and then user may enter the network. The users has two roles may be either as administrator (e.g., role 1) or an employee (e.g., role 2) which can have different kinds of systems applications to access than role 2. The identifier could be User1@domainname address.R1 for the administrator role. The alternative identifier could be User1@domainname address.R2 for the employee role. For another role, the identifier could User1@domainname address.R3 for role 3. When using a protocol, for example, within identifier there is a seed which is R1 but its derived conditional from what User1@domainname.R1 for that seed. As the seed is controlled at the server side. This process continues to the second and third category.R2 or .R3 and points to different applications, Application-Id1-Application-Id5.

In various aspects to enhance the security of the mobile device data, the device-id 502 and application-id 504 can store the information about how long it would be used, by user identification, geo-location (global positioning system (GPS) data), the time of period of the day (e.g., increments of only two, four, or six hours, such morning, afternoon, evening) and other similar data.

One or more aspects of the disclosure may be implemented with security network data. For example, an IPSEC circuit is commonly to pertain to IP Security, a set of protocols to support secure exchange of packet at the IP layer in a TCP/IP network system. IPSEC systems have been deployed widely to implement Virtual Private Networks (VPNs). Under an IPSEC system, two encryption modes are supported: Transport and Tunnel. Transport mode encrypts only the payload portion of each packet, but leaves the header. The Tunnel mode encrypts both the header and the payload. On the receiving side, an IPSEC-compliant device decrypts each packet. The methods and features recited herein further may be implemented through any number of non-transitory computer readable media that are able to store computer readable instructions. Examples of non-transitory computer readable media that may be used include RAM, ROM, EEPROM, flash memory or other memory technology, CD-ROM, DVD, or other optical disc storage, magnetic cassettes, magnetic tape, magnetic storage and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving, by a server processor, from a computing device, a request for access to an application provided via a computer network by the server processor;
   receiving, by the server processor, a first security key fragment from the computing device, the first security key fragment being paired with a predetermined verifier key fragment unknown to the computing device;
   generating, by the server processor, a conditional seed key fragment associated with the predetermined verifier key fragment;
   transmitting, by the server processor, to the computing device, the conditional seed key fragment while maintaining the predetermined verifier key fragment at the server processor;
   receiving, by the server processor, a first hash parameter generated based on a hash function of the conditional seed key fragment and the first security key fragment, wherein the first security key fragment is associated with a username, the conditional seed key fragment is associated with a plurality of computing devices comprising the computing device, and the predetermined verifier key fragment is associated with the application, and wherein the username comprises multiple cascaded components for authorizations to the computer network per computing device of a user and per application for access by an associated computing device with separate authorization sessions per computing device and application;
   comparing, by the server processor, the first hash parameter to a second hash parameter, the second hash parameter being generated by the server processor based on the predetermined verifier key fragment and the conditional seed key fragment;
   determining, by the server processor, whether the first hash parameter and the second hash parameter match; and
   if the first hash parameter and the second hash parameter match, transmitting, by the server processor, a session security key configured to enable access to the application provided via the computer network by the server processor.

2. The method of claim 1, wherein the first security key fragment comprises a biometric parameter of the user and the conditional seed key fragment comprises a numeric string comprising a plurality of randomly generated numbers.

3. The method of claim 1, wherein the first security key fragment comprises a biometric parameter of the user and the predetermined verifier key fragment comprises a numeric string comprising a plurality of randomly generated numbers.

4. The method of claim 1, wherein the first security key fragment comprises a biometric parameter of the user and the conditional seed key fragment comprises an alphanumeric string of characters.

5. The method of claim 1, wherein the conditional seed key fragment is generated based on a network location associated with the request for access received from the computing device.

6. The method of claim 1, wherein the conditional seed key fragment is generated based on a geographic location associated with the request for access received from the computing device.

7. The method of claim 1, comprising:
   if the first hash parameter and the second hash parameter do not match, transmitting, by the server processor, to the computing device, a new conditional seed key fragment.

8. The method of claim 1, wherein the application is associated with a plurality of applications.

9. One or more non-transitory computer-readable media storing instructions that, when executed by a server processor, cause the server processor to:
   receive, from a computing device, a request for access to an application provided via a computer network by the server processor;
   receive a first security key fragment from the computing device, the first security key fragment being paired with a predetermined verifier key fragment unknown to the computing device;
   generate a conditional seed key fragment associated with the predetermined verifier key fragment;
   transmit, to the computing device, the conditional seed key fragment while maintaining the predetermined verifier key fragment at the server processor;
   receive a first hash parameter generated based on a hash function of the conditional seed key fragment and the first security key fragment, wherein the first security key fragment is associated with a username, the conditional seed key fragment is associated with a plurality of computing devices comprising the computing device, and the predetermined verifier key fragment is associated with the application, and wherein the username comprises multiple cascaded components for authorizations to the computer network per computing device of a user and per application for access by an associated computing device with separate authorization sessions per computing device and application;
   compare the first hash parameter to a second hash parameter, the second hash parameter being generated by the server processor based on the predetermined verifier key fragment and the conditional seed key fragment;
   determine whether the first hash parameter and the second hash parameter match; and
   if the first hash parameter and the second hash parameter match, transmit a session security key configured to enable access to the application provided via the computer network by the server processor.

10. The one or more non-transitory computer-readable media of claim 9, wherein the first security key fragment comprises a biometric parameter of the user and the conditional seed key fragment comprises a numeric string comprising a plurality of randomly generated numbers.

11. The one or more non-transitory computer-readable media of claim 9, wherein the first security key fragment comprises a biometric parameter of the user and the predetermined verifier key fragment comprises a numeric string comprising a plurality of randomly generated numbers.

12. The one or more non-transitory computer-readable media of claim 9, wherein the first security key fragment comprises a biometric parameter of the user and the conditional seed key fragment comprises an alphanumeric string of characters.

13. The one or more non-transitory computer-readable media of claim 9, wherein the conditional seed key fragment is generated based on a network location associated with the request for access received from the computing device.

14. The one or more non-transitory computer-readable media of claim 9, wherein the conditional seed key fragment is generated based on a geographic location associated with the request for access received from the computing device.

15. The one or more non-transitory computer-readable media of claim 9, having additional instructions stored thereon that, when executed by the server processor, cause the server processor to:

if the first hash parameter and the second hash parameter do not match, transmit, to the computing device, a new conditional seed key fragment.

16. The one or more non-transitory computer-readable media of claim 9, wherein the application is associated with a plurality of applications.

17. A server processor comprising:

at least one processor; and memory storing instructions that, when executed by the at least one processor, cause the server processor to:

receive, from a computing device, a request for access to an application provided via a computer network by the server processor;

receive a first security key fragment from the computing device, the first security key fragment being paired with a predetermined verifier key fragment unknown to the computing device;

generate a conditional seed key fragment associated with the predetermined verifier key fragment;

transmit, to the computing device, the conditional seed key fragment while maintaining the predetermined verifier key fragment at the server processor;

receive a first hash parameter generated based on a hash function of the conditional seed key fragment and the first security key fragment, wherein the first security key fragment is associated with a username, the conditional seed key fragment is associated with a plurality of computing devices comprising the computing device, and the predetermined verifier key fragment is associated with the application, and wherein the username comprises multiple cascaded components for authorizations to the computer network per computing device of a user and per application for access by an associated computing device with separate authorization sessions per computing device and application;

compare the first hash parameter to a second hash parameter, the second hash parameter being generated by the server processor based on the predetermined verifier key fragment and the conditional seed key fragment;

determine whether the first hash parameter and the second hash parameter match; and if the first hash parameter and the second hash parameter match, transmit a session security key configured to enable access to the application provided via the computer network by the server processor.

18. The server processor of claim 17, wherein the first security key fragment comprises a biometric parameter of the user and the conditional seed key fragment comprises a numeric string comprising a plurality of randomly generated numbers.

19. The server processor of claim 17, wherein the first security key fragment comprises a biometric parameter of the user and the predetermined verifier key fragment comprises a numeric string comprising a plurality of randomly generated numbers.

20. The server processor of claim 17, wherein the first security key fragment comprises a biometric parameter of the user and the conditional seed key fragment comprises an alphanumeric string of characters.

* * * * *